Sept. 5, 1967     J. D. RICHARD     3,339,543
PULSE INTERVAL RECORDING APPARATUS
Filed March 19, 1964     2 Sheets-Sheet 1
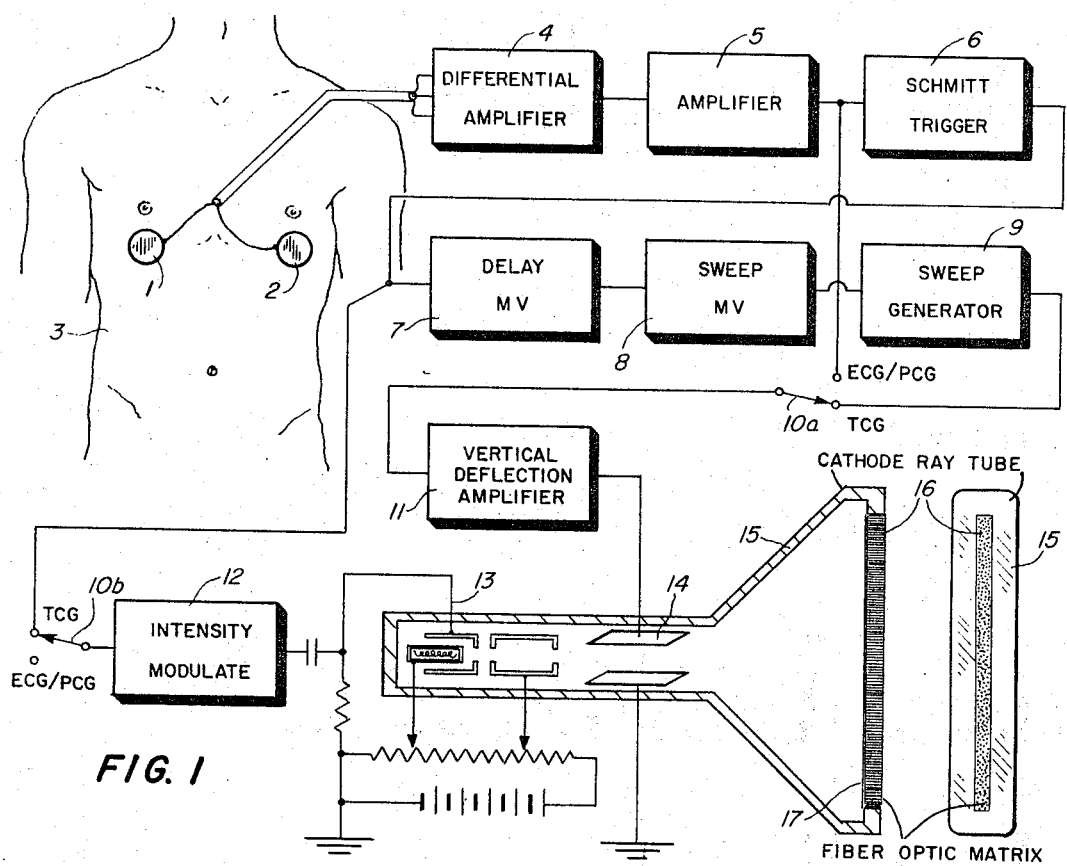
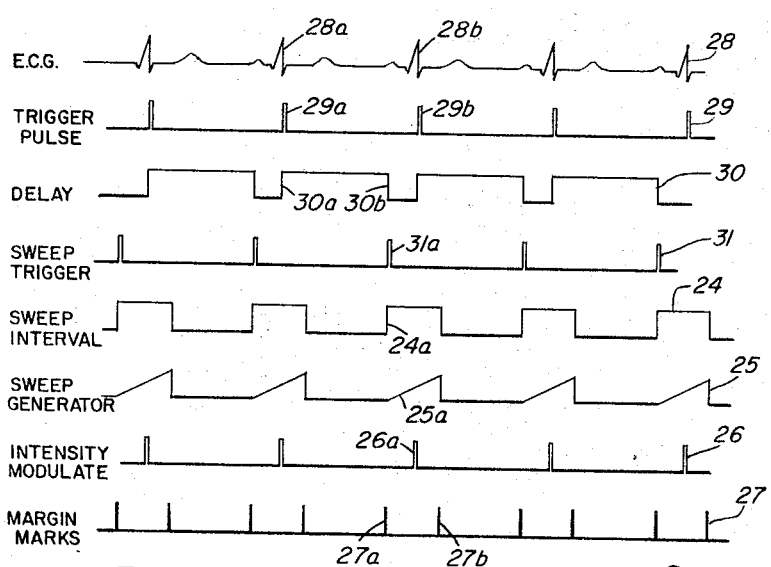
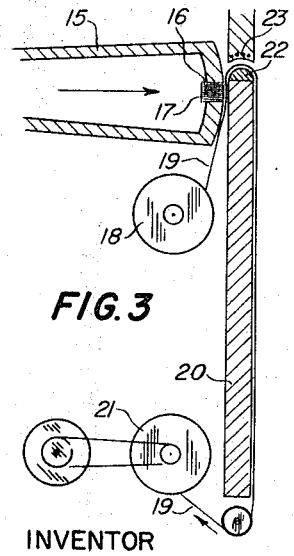
INVENTOR
Joseph D. Richard Sept. 5, 1967            J. D. RICHARD            3,339,543
PULSE INTERVAL RECORDING APPARATUS
Filed March 19, 1964            2 Sheets-Sheet 2
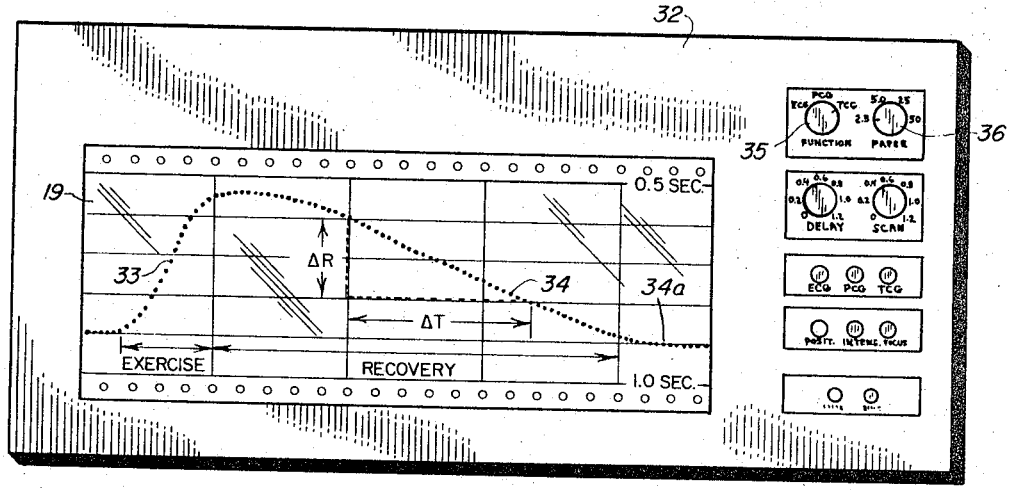
FIG. 4
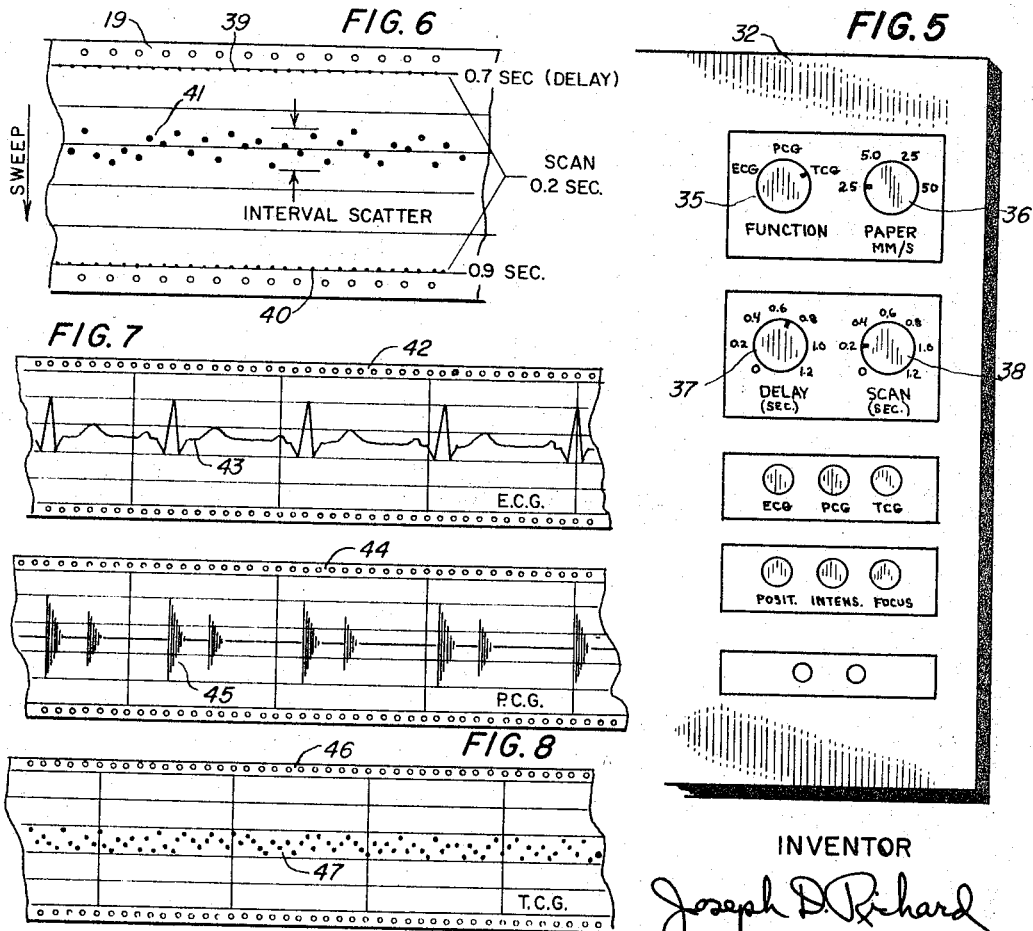
FIG. 6
FIG. 5
FIG. 7
FIG. 8
FIG. 9
INVENTOR
Joseph D. Richard

United States Patent Office 3,339,543
Patented Sept. 5, 1967

3,339,543
PULSE INTERVAL RECORDING APPARATUS
Joseph D. Richard, 3613 Loquat Ave.,
Miami, Fla. 33133
Filed Mar. 19, 1964, Ser. No. 353,171
10 Claims. (Cl. 128—2.06)

This invention relates to measuring and recording systems and more particularly to apparatus for recording the time intervals between a series of pulses.

An object of the present invention is to provide apparatus for continuously recording the time intervals between a succession of pulses so that the interval variability may be accurately measured.

Another object of the present invention is to provide apparatus for measuring and recording the rate of change of the time intervals between a succession of pulses.

A further object of the present invention is to provide apparatus for graphically recording the time intervals between pulses of intermittently received pairs of pulses having varying intervals.

The invention includes apparatus for recording time intervals between successive pulses on a graphic medium so that variability and rate of change may be conveniently and accurately measured. A cathode ray tube, having a linear single axis sweep, is modified for direct graphic recording. The sweep is triggered by a first pulse and the electron beam is intensity modulated by the following pulse. The distance traversed by the sweep during the interim is an accurate measure of the time interval between the pulses. A photosensitive recording paper is continuously moved across the face of the cathode ray tube so that the time intervals between the pulses of each pair are recorded as a series of marks. Each interval is represented by the distance from the base line to an individual mark. If the time intervals between pulses remain constant, the marks will form a straight line as shown at the end portion 34a of the recorded trace in FIGURE 4. If the time intervals are variable, the line of marks will be scattered a corresponding amount. The absolute interval values and the interval variability can be accurately measured by means of a graduated scale superimposed on the paper record. In a preferred embodi- of the invention, a precise time delay is initiated by a first pulse and the cathode ray tube sweep is triggered at the termination of the delay interval. The pulse interval variations can thereby be resolved and measured with greatly improved accuracy using a relatively narrow recording paper.

FIGURE 1 shows a diagram of the pulse interval recording apparatus according to my invention.

FIGURE 2 shows the time sequence of the various electrical waveforms generated during the operation of the apparatus shown in FIGURE 1.

FIGURE 3 is a diagram of the graphic recording portion of the system shown in FIGURE 1.

FIGURE 4 shows the front view of the pulse interval recorder.

FIGURE 5 shows an enlarged view of the various controls of the pulse interval recorder.

FIGURE 6 shows a typical graphic recording of a series of time intervals between the R waves of an electrocardiogram.

FIGURE 7 shows a conventional electrocardiogram recorded by the apparatus of FIGURE 1 using an alternate mode of operation.

FIGURE 8 shows a conventional phonocardiogram recorded by the apparatus of FIGURE 1 using the alternate mode of operation.

FIGURE 9 shows a "tachycardiogram" recorded by the apparatus of FIGURE 1. A tachycardiogram is a graphic representation of cardiac rate or interval.

FIGURE 1 shows a pair of electrodes 1 and 2 attached to a clinical subject 3. The electrical impulses picked up by the electrodes 1 and 2 are fed into the differential amplifier 4. These signals are further amplified by the amplifier 5 and the resulting pulses are used to trigger the Schmitt trigger circuit 6. The pulses of uniform amplitude and duration from the output of the trigger circuit 6 are used to trigger the delay multivibrator 7 thereby initiating a precise and predetermined delay interval. The delay interval is selectable, for example, in precise 0.1 second steps over the range zero to 1.2 seconds. The sweep multivibrator 8 is triggered at the termination of the delay period. The time duration of the sweep multivibrator 8 output is selectable, for example, in precise 0.1 second steps over the range zero to 1.2 seconds. The sweep generator 9 generates a linear triangular waveform having a time duration equal to the output of the sweep multivibrator 8. The output of the sweep generator 9 is amplified by the vertical deflection amplifier 11. The output of the vertical deflection amplifier 11 is used to deflect the electron beam of the cathode ray tube 15 by means of deflection plates 14. The output of the Schmitt trigger 6 drives the intensity modulator 12 which is used to intensify the electron beam current of the cathode ray tube. As an alternative, the amplified signals from the amplifier 5 may be used to intensity modulate the electron beam.

A glass fibre matrix 16 is mounted within the rectangular face plate of the cathode ray tube 15. A "phosphor" layer 17 covers the inner ends of the glass fibres. Light is emitted when the electron beam impinges on the "phosphor" layer 17. A portion of the emitted light passes through the adjacent glass fibres. As the electron beam is swept vertically along the inner side of the fibre matrix 16, it is varied in intensity by the electrical output of the intensity modulator 12. Increases in electron beam current result in a corresponding increase in the light output from the glass fibre matrix 16.

FIGURE 2 shows the time relationships of the various electrical waveforms generated in the operation of the apparatus of FIGURE 1. An electrocardiogram record 28 is shown after amplification by the amplifier 5. Trigger pulses 29 are generated by the Schmitt trigger circuit 6 in response to the R waves of the electrocardiogram 28. Time delay pulses 30 are generated by the delay multivibrator 7. Sweep trigger pulses 31 are derived coincidently with the trailing edge of the delay pulses 30. Sweep interval pulses 24 are generated by the sweep multivibrator 8 when triggered by the sweep trigger pulses 31. The sweep triangular waveforms 25 are generated by the sweep generator 9. Intensity modulation pulses 26 are amplified by the intensity modulator 12. In an alternate mode of operation, the margin marks 27 may be used to intensity modulate the electron beam at the beginning and end of each sweep. The margin marker pulses 27 are derived by differentiation of the leading and trailing edges of the sweep interval pulse 24. In FIGURE 2 the time sequence of the various pulses runs from left to right. The leading edge of each pulse is on the left and the trailing edge is on the right. The cardiac pulse 28a initiates the trigger pulse 29a. The trigger pulse 29a initiates and is therefore coincident with the leading edge 30a of the delay pulse. The delay interval is terminated coincidently with the trailing edge 30b of the delay pulse. The sweep trigger pulse 31a is initiated coincidently with the trailing edge 30b of the delay pulse. The sweep interval pulse 24a is initiated by the sweep trigger pulse 31a. The sweep generator triangular wave 25a occurs concurrently with the sweep interval pulse 24a. The intensity modulate pulse 26a is triggered by the cardiac pulse 28b. Margin marks 27a and 27b occur coincidently with (and may be obtained by differentiation of) the leading and trailing edges of the sweep interval pulse 24a. When the delay interval is reduced to zero the sweep interval pulses 24 are initiated coincidently with the trigger pulses 29.

FIGURE 3 shows a top view of the cathode ray tube 15 in which the electron beam is impinging on the "phosphor" layer 17 which covers the inner surface of the glass fibre matrix 16. A roll 18 of photosensitive paper 19 is threaded past the face of the cathode ray tube 15 so that the emulsion side bears lightly against the outer surface of the glass fibre matrix 16. The photosensitive paper 19 is drawn past the face of the cathode ray tube 15 by the motor drive at a rate of, for example, 2.5 mm./sec. The paper 19 is darkened in proportion to the amount of light emerging from the glass fibre matrix 16. Whenever a pulse from the modulator 12 intensifies the electron beam, the increased light output of the "phosphor" layer 17 results in a dark spot on the recording paper 19. The "phosphor" emits light having a wavelength near the peak sensitivity of the photosensitive paper. The operation of the apparatus of FIGURE 1 and the waveforms of FIGURE 2 result in a graphic recording of cardiac intervals as shown in FIGURE 6.

The photosensitive recording paper 19 develops a visible trace without the need for chemical treatment. Several varieties of direct print-out paper are commercially available and they are commonly used with mirror galvanometer type graphic recorders. Some of these photographic papers are sensitive only to ultraviolet light. The photo-sensitive material is primarily a dispersion of silver halide crystals in gelatin, similar to conventional photographic emulsions. However, certain additives give the emulsions the capability for dry image development. The exposed image becomes visible by photolysis when exposed to normal room lighting. If the latent image is heated to about 250° F. followed by exposure to strong light the image can be made visible in a few seconds. A heater element 23 is used in the apparatus of FIGURE 3 to heat the exposed section of the recording paper before the latensification by the ambient light. A suitable light source can be used to illuminate the paper record to further increase the rate of image latensification.

In FIGURE 4 the pulse interval recorder is set so that the delay interval is 0.5 sec. and the scan (or sweep) interval is also 0.5 sec. The graphic recording shows the change of cardiac intervals during exercise 33 followed by a rest period 34. The intervals decrease rapidly to almost 0.5 second and then gradually return to a normal of about 0.9 second. An unusually long scan period is used to accommodate the wide excursion of cardiac intervals caused by the exercise.

FIGURE 5 shows the various control settings of the pulse interval recorder which are used to obtain the graphic record shown in FIGURE 6. The T.C.G. (tachycardiogram) function and a paper speed of 2.5 mm./sec. are selected by the function selector switch 35 and the paper speed control switch 36. A delay period of 0.7 second and a scan period of 0.2 second are also selected by the delay control 37 and the scan or sweep control 38. The graphic recording in FIGURE 6 shows that the average cardiac interval is about 0.78 second and the interval scatter is about 0.04 second. A longer recording would also show any gradual drift in the average interval which might also be significant. Margin marks 39 and 40 are shown on the graphic recording. These marks show the beginning and end of the scan (or sweep) interval. The sweep generator output and the vertical position of the electron beam are adjusted so that the scan interval coincides exactly with the graduated grid scale used to measure the recorded intervals. As indicated in FIGURE 5 the delay control 37 may be varied from 0 to 1.2 second. With zero delay the sweep is triggered coincident with a first pulse and the electron beam current is intensified coincident with a following pulse.

A conventional electrocardiogram trace 43 recorded on the paper strip 42 is shown in FIGURE 7. When the switches 10a and 10b of the apparatus of FIGURE 1 are turned to the E.C.G./P.C.G. position the recorder may be used to record electrocardiograms or phonocardiograms. In these alternate modes of operation the electron beam is not swept in the conventional sawtooth manner. The electron beam is positioned near the center of the glass fibre matrix and the beam current is set to a constant intensity adequate to record a continuous line on the recording paper as it moves past the face of the cathode ray tube. The electrocardiogram or phonocardiogram signals are used to the drive the vertical deflection amplifier so that a continuous trace is recorded on the paper. A higher paper speed would normally be used for the E.C.G./P.C.G. functions. Obviously a microphone positioned over the heart of the clinical subject 3 must be used in place of the electrodes 1 and 2 when a phonocardiogram is recorded. A typical phonocardiogram trace 45 recorded on the paper strip 44 is shown in FIGURE 8. A typical tachycardiogram trace 47 recorded on the paper strip 46 is shown in FIGURE 9.

The pulse interval recording apparatus described herein is particularly useful for measuring cardiac intervals, cardiac interval variability, and rate of change of cardiac interval. For this and similar applications a continuous succession of pulses is fed into the apparatus. An alternative use of the same apparatus would be to record the intervals between the pulses of intermittently received pairs of pulses. For example a telemetering device can be made to transmit one or more pairs of pulses so that the transmitted information is contained in the time interval between the two pulses of the pair. A device of this type might be used to telemeter the depth of an instrument or fish trawl in the ocean. The device would periodically transmit a pair of pulses. The time interval between the pulses would vary with the depth—perhaps 10 milliseconds for every fathom of depth. It may be readily appreciated that the depth of such a device could be continuously recorded by the apparatus shown in FIGURE 1. The repetition rate of the pulse pairs would not be critical. The first pulse of each pair would trigger the CRT sweep and the second pulse of the pair would intensify the electron beam to indicate pulse interval.

The intervals between R waves of a typical electrocardiogram are shown as an example of the operation of the pulse interval recorder. Obviously other wave intervals of the cardiac cycle may also be recorded and measured. If the cardiac signals are amplified and processed to accentutate the various waves, an intensifying pulse can be generated to mark the recording paper at the peak of each wave. In this manner the total interval, the P-R interval, the QRS duration, and various other intervals and segments can be recorded and measured.

Although preferred forms of the invention have been described and illustrated herein it will be understood that the invention may be embodied in other forms coming within the scope and meaning of the appended claims.

What is claimed is:

1. Apparatus for graphically recording the time intervals between successive electrical pulses comprising: an input for receiving a succession of electrical pulses; a cathode ray tube including means for deflecting an axial beam of electrons laterally across a faceplate in response to a triangular wave; a sweep generator having a triangular wave output of predetermined duration; triggering means responsive to a first electrical pulse from the said input for initiating the said sweep generator; means for intensifying the electron beam current of the said cathode ray tube coincident with the reception of a second electrical pulse from the said input; a target element disposed within the faceplate of the said cathode ray tube for converting energy of the said electron beam into electromagnetic radiation; a transparent element disposed adjacent the said target element for passing the emitted electromagnetic radiation through the aforementioned cathode ray tube faceplate; and an elongated paper strip having a photosensitive surface disposed against the outer surface of the said cathode ray tube faceplate, a spot image thereby being printed on the said paper when the electron beam is intensified by an electrical pulse, the lateral displacement of the spot image being a measure of the time interval between the aforementioned first and second electrical pulses.

2. Apparatus for graphically recording the time intervals between successive electrical pulses comprising: an input for receiving a series of electrical pulses; a cathode ray tube having means for deflecting an electron beam along the axis of an elongated faceplate in response to triangular waves; a sweep generator having a triangular wave output of predetermined duration and linear characteristic; means for triggering the said sweep generator in response to electrical pulses in the said input; means for intensifying the electron beam current of the said cathode ray tube coincident with the electrical pulses in the said input; an elongated fibre optic matrix within the said cathode ray tube faceplate, the said fibre optic matrix being disposed along the sweep axis of the aforementioned electron beam; a luminescent phosphor material covering the inner surface of the said fibre optic matrix, the said phosphor emitting light of a characteristic wavelength when excited by the said electron beam; an elongated paper strip having a photosensitive surface disposed against the outer surface of the said fibre optic matrix, a spot image thereby being printed on the said paper when the aforementioned electron beam is intensified by electrical pulses; and means for moving the said paper strip across the outer surface of the said fibre optic matrix, a series of spot images thereby being printed on the said paper, the lateral displacements of which are a measure of the time intervals between successive pulses in the said input.

3. Apparatus for graphically recording time intervals between successive electrical pulses comprising: an input for receiving a succession of electrical pulses; a cathode ray tube including means for deflecting an electron beam along at least one axis of a faceplate in response to triangular waves; a sweep generator having a triangular wave output of predetermined duration and substantially linear characteristic; means for initiating a delay interval coincident with the reception of a first pulse in the said input; means for triggering the said sweep generator at the termination of the said delay interval; means for intensifying the electron beam current of the said cathode ray tube coincident with a second pulse in the said input; a target element within the faceplate of the said cathode ray tube, the said target element being disposed along the sweep axis of the aforementioned electron beam; means within the said target element for converting electron beam energy into electromagnetic energy; a window element disposed adjacent the said target element for passing the emitted electromagnetic energy through the said cathode ray tube faceplate; an elongated paper strip having a photosensitive surface disposed against the outer surface of the said window element, a spot image being thereby printed on the said paper when the aforementioned electron beam is intensified by electrical pulses; and means for moving the said paper strip across the outer surface of the said window, a series of spot images being thereby printed on the said paper the lateral displacements of which are a measure of the time intervals between successive pulses in the said input.

4. Apparatus for graphically recording the variability of time intervals between a succession of electrical pulses comprising: an input for receiving a succession of electrical pulses; a cathode ray tube including means for deflecting an axial beam of electrons laterally across a faceplate in response to a sweep waveform; a sweep generator having a sweep waveform output of predetermined duration and linear characteristic; a delay circuit having a predetermined interval; means for initiating the delay interval coincident with the reception of a first pulse in the said input; means for triggering the said sweep generator at the termination of the said delay interval; means for intensifying the electron beam current of the said cathode ray tube coincident with a second pulse in the said input; an elongated fibre optic element within the said cathode ray tube faceplate, the said fibre optic element being disposed along the deflection axis of the aforementioned electron beam; a luminescent phosphor material covering the inner surface of the said fibre optic element, the said phosphor emitting light of a characteristic wavelength when excited by the said electron beam; an elongated paper strip having a photosensitive surface disposed against the outer surface of the said fibre optic element, a spot image thereby being printed on the said paper when the aforementioned electron beam is intensified by electrical pulses; and means for moving the said paper strip across the outer surface of the said fibre optic element, a series of spot images thereby being printed on the said paper, the relative lateral displacements of which are a measure of the variability of the time intervals between successive pulses in the said input.

5. Apparatus for graphically recording time intervals between successive electrical pulses comprising: an input for receiving a series of electrical pulses; a cathode ray tube including means for deflecting an axial beam of electrons laterally across a faceplate in response to sweep pulses; means for generating a first series of trigger pulses coincident with electrical pulses in the said input; a delay pulse generator having a predetermined interval; means for initiating delay pulses coincident with the said first series of trigger pulses; means for generating a second series of trigger pulses coincident with the termination of the said delay pulses; a sweep pulse generator having a predetermined interval; means for initiating the sweep pulses coincident with the said second series of trigger pulses; means for intensifying the electron beam current of the said cathode ray tube coincident with the said first series of trigger pulses; an elongated fibre optic element within the said cathode ray tube faceplate, the said fibre optic element being disposed along the deflection axis of the aforementioned electron beam; a light emissive phosphor covering the inner surface of the said fibre optic element, the said phosphor emitting light when excited by the said electron beam; an elongated web material having a photosensitive surface disposed against the outer surface of the said fibre optic element, a visible spot image being thereby printed on the said web material when the aforementioned electron beam is intensified by electrical pulses; and means for moving the said web material across the outer surface of the said fibre optic element, a series of visible spot images thereby being printed on the said web material, the relative lateral displacements of which are a measure of the time intervals between successive pulses in the said input.

6. Apparatus for graphically recording time intervals between successive pulses of an electro-cardiac signal comprising: electrode means for picking up varying cardiac potentials from a clinical subject; means for amplifying the said potentials, a series of amplified electrical pulses thereby resulting; a cathode ray tube including means for deflecting an electron beam along at least one axis of a faceplate in response to triangular waves; a sweep generator having a triangular wave output of predetermined duration and linear characteristic; means for triggering the said sweep generator in response to electrical pulses from the said amplifier; means for intensifying the electron beam current of the said cathode ray tube coincident with electrical pulses from the said amplifier; a target element within the faceplate of the said cathode ray tube, the said target element being disposed along the sweep axis of the aforementioned electron beam; means within the said target element for converting electron beam energy into electromagnetic energy; a window element disposed adjacent the said target element for passing the emitted electromagnetic energy through the said cathode ray tube faceplate; an elongated paper strip having a photosensitive surface disposed against the outer surface of the window element, a spot image being thereby printed on the said paper when the aforementioned electron beam is intensified by an electrical pulse; and means for moving the said paper strip across the outer surface of the said window element, a series of spot images being thereby printed on the said paper, the lateral displacements of which are a measure of the time intervals between successive pulses from the said amplifier.

7. Apparatus for graphically recording the time intervals between successive waves of an electro-cardiac signal comprising: electrode means for picking up varying cardiac potentials from a clinical subject; means for amplifying the said potentials, a series of electrical pulses being thereby obtained; a cathode ray tube having means for deflecting an electron beam along the axis of an elongated faceplate in response to triangular waves; a sweep generator having a triangular wave output of predetermined duration and linear characteristic; means for triggering the said sweep generator in response to electrical pulses from the said amplifier; means for intensifying the electron beam current of the said cathode ray tube coincidently with the electrical pulses from the said amplifier; an elongated fibre optic matrix within the said cathode ray tube faceplate, the said fibre optic matrix being disposed along the sweep axis of the aforementioned electron beam; a luminescent phosphor material covering the inner surface of the said fibre optic matrix, the said phosphor emitting light of a characteristic wavelength when excited by the said electron beam; an elongated paper strip having a photosensitive surface disposed against the outer surface of the said fibre optic matrix, a spot image thereby being printed on the said paper when the aforementioned electron beam is intensified by an electrical pulse; and means for moving the said paper strip across the outer surface of the said fibre optic matrix, a series of spot images being thereby printed on the said paper the lateral displacements of which are a measure of the time intervals between successive pulses from the said amplifier.

8. Apparatus for graphically recording the time intervals between successive waves of an electro-cardiac signal comprising: electrode means for picking up varying cardiac potentals from a clinical subject; means for amplifying the said potentials, a series of electrical pulses being thereby obtained; a cathode ray tube including means for deflecting an electron beam along at least one axis of a faceplate in response to triangular waves; a sweep generator having a triagular wave output of predetermined duration and substantially linear characteristic; means for initiating a delay interval coincident with the reception of a first pulse from the said amplifier; means for triggering the said sweep generator at the termination of the said delay interval; means for intensifying the electron beam current of the said cathode ray tube coincident with a second pulse from the said amplifier; a target element within the faceplate of the said cathode ray tube, the said target element being disposed along the sweep axis of the aforementioned electron beam; means within the said target element for converting electron beam energy into electromagnetic energy; a window element disposed adjacent the said target element for passing the emitted electromagnetic energy through the said cathode ray tube faceplate; an elongated paper strip having a photosensitive surface disposed against the outer surface of the said window element, a spot image being thereby printed on the said paper when the aforementioned electron beam is intensified by electrical pulses; and means for moving the said paper strip across the outer surface of the said window, a series of spot images being thereby printed on the said paper the lateral displacements of which are a measure of the time intervals between successive pulses from the said amplifier.

9. Apparatus for graphically recording the time intervals between successive waves of an electro-cardiac signal comprising: electrode means for picking up varying cardiac potentials from a clincial subject; means for amplifying the said potentials, a series of electrical pulses being thereby obtained; a cathode ray tube including means for deflecting an axial beam of electrons laterally across a faceplate in response to a sweep waveform; a sweep generator having a sweep waveform output of predetermined duration and linear characteristic; a delay circuit having a predetermined interval; means for initiating the delay interval coincident with the reception of a first pulse from the said amplifier; means for triggering the said sweep generator at the termination of the said delay interval; means for intensifying the electron beam current of the said cathode ray tube coincident with a second pulse from the said amplifier; an elongated fibre optic element within the said cathode ray tube faceplate, the said fibre optic element being disposed along the deflection axis of the aforementioned electron beam; a luminescent phosphor material covering the inner surface of the said fibre optic element, the said phosphor emitting light of a characteristic wavelength when excited by the said electron beam; an elongated paper strip having a photosensitive surface disposed against the outer surface of the said fibre optic element, a spot image thereby being printed on the said paper when the aforementioned electron beam is intensified by an electrical pulse; and means for moving the said paper strip across the outer surface of the said fibre optic element, a series of spot images thereby being printed on the said paper, the relative lateral displacements of which are a measure of the variability of the time intervals between successive pulses from the said amplifier.

10. Apparatus for graphically recording the time intervals between successive waves of an electro-cardiac signal comprising: electrode means for picking up varying cardiac potentials from a clinical subject; means for amplifying the said potentials, a series of electrical pulses being thereby obtained; a cathode ray tube including means for deflecting an axial beam of electrons laterally across a faceplate in response to sweep pulses; means for generating a first series of trigger pulses coincident with electrical pulses from the said amplifier; a delay pulse generator having a predetermined interval; means for initiating delay pulses coincident with the said first series of trigger pulses; means for generating a second series of trigger pulses coincident with the termination of the said delay pulses; a sweep pulse generator having a predetermined interval; means for initiating the sweep pulses coincident with the said second series of trigger pulses; means for intensifying the electron beam current of the said cathode ray tube coincident with the said first series of trigger pulses; an elongated fibre optic element within the said cathode ray tube faceplate, the said fibre optic element being disposed along the deflection axis of the aforementioned electron beam; a light emissive phosphor covering the inner surface of the said fibre optic element, the said phosphor emitting light when excited by the said electron beam; an elongated web material having a photosensitive surface disposed against the outer surface of the said fibre optic element, a visible spot image being thereby printed on the said web material when the aforementioned electron beam is intensified by an electrical pulse;

and means for moving the said web material across the outer surface of the said fibre optic element, a series of visible spot images thereby being printed on the said web material, the relative lateral displacements of which are a measure of the time intervals between successive pulses from the said amplifier.

References Cited

UNITED STATES PATENTS

| | | | |
|---|---|---|---|
| 2,447,018 | 8/1948 | Keinath | 128—2.05 |
| 2,546,814 | 3/1951 | Augustadt | 324—68 |
| 2,591,738 | 4/1952 | Spencer | 324—68 X |
| 2,716,236 | 8/1955 | Reinish et al. | 324—68 |
| 2,756,741 | 7/1956 | Campanella | 128—2.05 |
| 3,101,082 | 8/1963 | Steen et al. | 128—2.05 |
| 3,146,777 | 9/1964 | Lee | 128—2.05 |
| 3,215,136 | 4/1965 | Holter et al. | 128—2.06 |
| 3,236,230 | 2/1966 | Follett | 128—2.05 |
| 3,267,933 | 8/1966 | Mills et al | 128—2.06 |
| 3,267,934 | 8/1966 | Thornton | 128—2.06 |

RICHARD A. GAUDET, *Primary Examiner.*

SIMON BRODER, ROBERT E. MORGAN, *Examiners.*